March 31, 1925.
R. J. STOKES
1,531,999
DISK FOR FLEXIBLE COUPLINGS
Filed Feb. 21, 1920
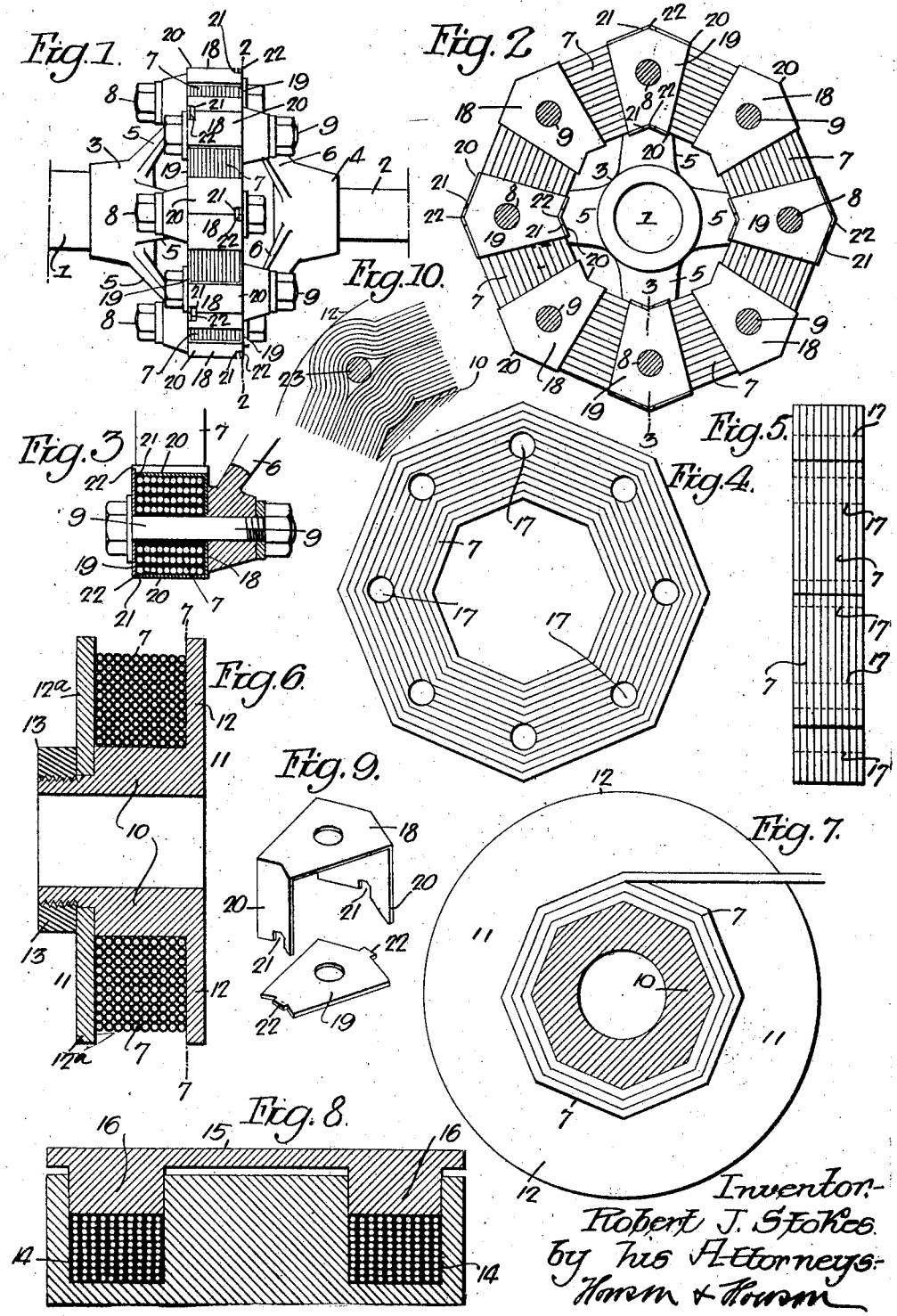
Inventor:
Robert J. Stokes
by his Attorneys
Harm & Harm Patented Mar. 31, 1925.

1,531,999

UNITED STATES PATENT OFFICE.

ROBERT J. STOKES, OF TRENTON, NEW JERSEY, ASSIGNOR TO THERMOID RUBBER COMPANY, OF HAMILTON TOWNSHIP, NEW JERSEY, A CORPORATION OF NEW JERSEY.

DISK FOR FLEXIBLE COUPLINGS.

Application filed February 21, 1920. Serial No. 360,510.

*To all whom it may concern:*

Be it known that I, ROBERT J. STOKES, a citizen of the United States, residing in Trenton, Mercer County, New Jersey, have invented certain Improvements in Disks for Flexible Couplings, of which the following is a specification.

My invention relates to certain improvements in disks used in flexible couplings located between a driving and a driven element. A coupling of this type is especially applicable for use in connection with the driving parts of an automobile where the several elements should be flexibly connected.

The object of my invention is to make a substantial disk, which will have sufficient flexibility for the purpose for which it is intended, yet will withstand the strains to which a coupling of this type is subjected.

In the accompanying drawings:

Fig. 1 is a side view of a coupling illustrating my invention;

Fig. 2 is a sectional view on the line 2—2, Fig. 1, drawn to a slightly larger scale;

Fig. 3 is a sectional view on the line 3—3, Fig. 2;

Fig. 4 is a side view of the disk detached from the coupling and detached from the plates;

Fig. 5 is an edge view of the disk;

Fig. 6 is a view showing the spool and the method of winding the spool to form the disk;

Fig. 7 is a sectional view on the line 7—7, Fig. 6, showing the cord partially wound on the hub of the spool;

Fig. 8 is a view showing the disk in the vulcanizing press;

Fig. 9 is a detached perspective view showing the clamp plates that are located at each bolt which secures the ring to the spider; and Fig. 10 is a view of a modification.

1 is a driving shaft, in the present instance. 2 is the driven shaft. 3 is a spider secured to the driving shaft and 4 is a spider secured to the driven shaft. In the present instance, the spider 3 has four arms 5 and the spider 4 has an equal number of arms 6, which alternate with the arms of the spider 3, as clearly shown in the drawings. 7 is the driving disk. 8 are bolts, which pass through the arm 5 of the spider 3 and through the disk 7, clamping the disk rigidly to the spider, while bolts 9 pass through the arm 6 of the spider 4 and through the disk, as clearly shown in Fig. 3, clamping the disk rigidly to the spider 4.

The disk, in the present instance, consists of cord and rubber vulcanized so that there is a certain amount of flexibility, which takes up any irregularity and which allows for any unevenness between the driving and driven shaft. The driving disk, which is the main feature of my invention, consists of cord of a given thickness. In the present instance, this cord is covered with rubber and is wrapped on the hub 10 of a spool 11 having deep flanges 12, 12$^a$. The flange 12 is fixed to the hub and the flange 12$^a$ is movable, being held in place by a nut 13, as clearly shown in Fig. 6. There are eight bolts securing the ring to the spider and in order that the cords will be on the direct line of strain, I make the hub octagonal, as clearly shown in Fig. 7 and wrap the cord firmly on the hub, as shown in Figs. 6 and 7. When the disk is of the proper diameter it is removed from the spool 11 and placed in the lower portion 14 of a mold illustrated in Fig. 8, and a cap plate 15 having an annular projection 16 is placed on the coil of cord and pressure is applied so as to reduce the width of the ring to the proper diameter and to make it of the proper density. The mold, with the ring therein, is placed in a vulcanizer or hydraulic press of any suitable type and the rubber vulcanized, after which the ring is removed and is of the form illustrated in Figs. 4 and 5. Holes 17 are punched in the disk, as shown in Fig. 4. for the reception of the bolts 8 and 9. These holes are punched on a radial line taken through the corner of the octagon, as clearly shown in said figure. It will be noticed that the cords are straight from one hole to the other.

In some instances, I may bolt the disks directly to the spiders, using ordinary round washers, but I prefer to enclose the disk at the bolts with plates 18 and 19, as shown in detail in Fig. 9. The plate 18 has depending portions 20 notched at 21 to receive tongues 22 on the plate 19. These plates take the place of the washers, as illustrated in Figs. 1 and 3, so that the disk is firmly clamped to the two spiders 3 and 4, yet it is free to flex under strains.

While I have illustrated the holes 17 made by punching the disk after being formed and thus cutting some of the cords, I may make the disk as illustrated in Fig. 10, by placing pins 23 in openings in the flanges of the spool at the point where the bolts would be placed and then wrap the cords on the spool, passing on either side of the pins.

It will be noticed that while I have shown a disk of a given thickness, the width and diameter may be varied without departing from the essential features of the invention. The size of the cords may also be varied.

While I have illustrated a single disk connecting the spiders, two or more disks may be used, depending upon the drive and flexibility desired.

While I have illustrated the disk as made from a single cord, wrapped around the hub of a spool to form the disk, a number of cords may be used, if found desirable.

I claim:

The combination of a driving disk consisting of cords and rubber, said disk having an open center and perforated; a driving and a driven shaft; a spider on each shaft having arms, the arms being perforated in line with the perforations in the driving disk, the arms being arranged alternately in respect to each other; bolts securing the arms to the driving disk; and two plates at each bolt, one of said plates having a depending portion at each end, said depending portions being notched, the other plate having projections adapted to the notches so that when the bolts clamp the disk to the spider the plates will tend to hold the disk so that the flexing of the disk will be between the plates of the series.

ROBERT J. STOKES.